United States Patent
Wang

(10) Patent No.: US 11,953,621 B2
(45) Date of Patent: Apr. 9, 2024

(54) OPTICAL PHASED ARRAY, METHOD FOR IMPROVING REDUCING A PHASE ERROR THEREOF, LiDAR, AND INTELLIGENT APPARATUS

(71) Applicant: SUTENG INNOVATION TECHNOLOGY CO., LTD., Shenzhen (CN)

(72) Inventor: Jing Wang, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 259 days.

(21) Appl. No.: 17/520,601

(22) Filed: Nov. 5, 2021

(65) Prior Publication Data

US 2022/0057488 A1 Feb. 24, 2022

Related U.S. Application Data

(63) Continuation of application No. PCT/CN2019/086018, filed on May 8, 2019.

(51) Int. Cl.
*G01C 3/08* (2006.01)
*G01S 7/481* (2006.01)
*G01S 17/08* (2006.01)
*G02B 6/12* (2006.01)
(Continued)

(52) U.S. Cl.
CPC .............. *G01S 7/481* (2013.01); *G01S 17/08* (2013.01); *G02B 6/12007* (2013.01); *G02B 6/14* (2013.01); *G02B 6/29301* (2013.01)

(58) Field of Classification Search
CPC ........ G01S 7/481; G01S 17/08; G01S 7/4818; G01S 7/4817; G01S 17/02; G01S 7/484; G01S 7/4911; G02B 6/12007; G02B 6/14; G02B 6/29301
See application file for complete search history.

(56) References Cited

U.S. PATENT DOCUMENTS

2018/0052378 A1* 2/2018 Shin ..................... G02F 1/292

FOREIGN PATENT DOCUMENTS

| CN | 105759357 A | 7/2016 |
|---|---|---|
| CN | 107065072 A | 8/2017 |
| CN | 107533137 A | 1/2018 |

(Continued)

OTHER PUBLICATIONS

International Search Report issued in corresponding international application No. PCT/CN2019/086018, dated Feb. 21, 2020, 4 pages.

*Primary Examiner* — Samantha K Nickerson
(74) *Attorney, Agent, or Firm* — BAYES PLLC

(57) ABSTRACT

An optical phased array, a method for reducing a phase error thereof, a LiDAR, and an intelligent apparatus are provided. The optical phased array includes an optical signal output unit, a waveguide unit, and an antenna transmitting unit. The optical signal output unit is configured to output M optical signals. The waveguide unit includes M waveguide pipes, each waveguide pipe includes at least one connection waveguide, and each of the at least one connection waveguide includes an input mode converter, a wide waveguide, and an output mode converter that are connected in sequence. The antenna transmitting unit is configured to transmit M optical signals outputted from the waveguide unit.

5 Claims, 2 Drawing Sheets

(51) Int. Cl.
 *G02B 6/14* (2006.01)
 *G02B 6/293* (2006.01)

(56) References Cited

FOREIGN PATENT DOCUMENTS

| | | | |
|---|---|---|---|
| CN | 108700790 | A | 10/2018 |
| CN | 109491010 | A | 3/2019 |
| JP | 2015169766 | A | 9/2015 |

* cited by examiner

OPTICAL PHASED ARRAY, METHOD FOR IMPROVING REDUCING A PHASE ERROR THEREOF, LiDAR, AND INTELLIGENT APPARATUS

CROSS-REFERENCE TO RELATED APPLICATION

The present application is a bypass continuation of PCT/CN2019/086018 with an international filing date of May 8, 2019, the entirety of which is hereby incorporated by reference.

TECHNICAL FIELD

The present disclosure relates to the field of LiDAR, and in particular, relates to an optical phased array, a method for reducing a phase error thereof, a LiDAR, and an intelligent apparatus.

BACKGROUND

An optical phased array is an important part of an all-solid-state LiDAR system and has the advantages of complete solid-state, high reliability, small size, and convenient control or the like. The optical phased array can be realized by integrated optoelectronic technology. An optical antenna unit in the conventional skills includes a silicon-on-insulator (SOI) material, a silicon nitride material, an III-V material, or the like. Since a silicon-based optical phased array based on the SOI material can utilize a mature microelectronic complementary metal oxide semiconductor (CMOS) process platform, the silicon-based optical phased array based on the SOI material has received great attention from an industry in recent years.

Generally, the optical phased array includes an optical splitter, a tunable phase shifter, a connection waveguide, and an antenna transmitting unit. An input light can be divided into light in an equal proportion or light in an unequal proportion through the optical splitter. After the light passes through the tunable phase shifter, phases of the light are changed. After passing through a series of connection waveguides, the light is finally launched into a free space in the antenna transmitting unit.

In the process of realizing the present disclosure, the inventor of the present disclosure found that since most antenna transmitting units are currently arranged in parallel at a certain interval, an occupied area often cannot be changed. The phase shifters are usually large in size, especially in a large-scale optical phased array. To connect output ports of these large-size tunable phase shifters to a fixed-area antenna transmitting unit one by one, a large number of straight waveguides and curved waveguides are required. From a perspective of function, these waveguides are not necessary, but in practice, a large amount of areas in the entire optical phased array is occupied by these connecting waveguides. Taking a 64-channel silicon-based optical phased array as an example, the longest connecting waveguide is even up to several millimeters. These waveguides cause additional propagation loss. Further, more importantly, uncertainty in a waveguide width caused by process errors can cause very serious phase errors. These phase errors are gradually accumulated and impose one random disturbance on phase distribution of a theoretical arithmetic distribution, resulting in significant degradation of far-field spot quality of the optical phased array. Therefore, how to reduce an influence of the uncertainty in the waveguide width caused by the process error on a phase change is an urgent problem in the industry currently.

SUMMARY

According to some embodiments of the present disclosure, an optical phased array, a method for reducing a phase error thereof, a LiDAR, and an intelligent apparatus are provided.

According to an aspect of the present disclosure, an optical phased array is provided and includes an optical signal output unit, a waveguide unit, and an antenna transmitting unit. The optical signal output unit is configured to output M modulated optical signals, where M is a positive integer. The waveguide unit includes M waveguide pipes, each waveguide pipe includes at least one connection waveguide, the at least one connection waveguide includes an input mode converter, a wide waveguide, and an output mode converter that are connected in sequence. The input mode converter is configured to convert a narrow waveguide into a wide waveguide, the output mode converter is configured to convert a wide waveguide into a narrow waveguide, an input end of an input mode converter of the at least one connection waveguide is connected to the optical signal output unit, and an output end of the output mode converter of the at least one connection waveguide is connected to the antenna transmitting unit. The antenna transmitting unit is connected to the waveguide unit and is configured to transmit M optical signals transmitted by the waveguide unit.

According to another aspect of the present disclosure, a LiDAR is provided and includes the foregoing optical phased array, a light receiving unit, and a ranging unit.

According to still another aspect of the present disclosure, an intelligent apparatus is provided and includes the foregoing LiDAR.

According to yet another aspect of the present disclosure, a method for reducing a phase error is provided and applied to the foregoing optical phased array, and the method includes outputting M modulated optical signals, where M is a positive integer. The method also includes converting a first narrow waveguide mode for outputting the M modulated optical signals into a wide waveguide. The method also includes transmitting the optical signal by using at least one wide waveguide. The method also includes converting the wide waveguide mode into a second narrow waveguide for transmitting the optical signal. The method further includes transmitting the optical signal.

In some embodiments of the present disclosure, the optical phased array includes an optical signal output unit, a waveguide unit, and an antenna transmitting unit; the optical signal output unit is configured to output M modulated optical signals, where M is a positive integer; and the waveguide unit includes M waveguide pipes, each waveguide pipe includes at least one connection waveguide, the connection waveguide includes an input mode converter, a wide waveguide, and an output mode converter that are connected in sequence, the input mode converter is configured to convert a narrow waveguide into a wide waveguide, the output mode converter is configured to convert a wide waveguide into a narrow waveguide, an input end of an input mode converter of one connection waveguide is connected to the optical signal output unit, and an output end of the output mode converter of one connection waveguide is connected to the antenna transmitting unit; and the antenna transmitting unit is connected to the waveguide unit and is configured to transmit M optical signals transmitted by the waveguide unit. Therefore, a plurality of optical signals are transmitted through a wide waveguide, a width change of the wide waveguide due to a waveguide width change caused by a process error is less than that of the narrow waveguide in the conventional technology, and therefore, the phase error caused by the waveguide width change due to the process error can be reduced.

BRIEF DESCRIPTION OF THE DRAWINGS

One or more embodiments are illustrated exemplarily by the pictures in the accompanying drawings corresponding thereto, and these exemplary illustrations do not constitute a limitation on the embodiment, and elements in the accompanying drawings having the same reference numerical designation are indicated as similar elements, and the drawings in the accompanying drawings do not constitute a limitation of scale unless specifically stated.

DETAILED DESCRIPTION

The following describes exemplary embodiments of the present disclosure with more details with reference to the accompanying drawings. Although the exemplary embodiments of the present disclosure are shown in the accompanying drawings, it should be understood that the present disclosure may be implemented in various forms and should not be limited by the embodiments set forth herein. On the contrary, the embodiments are provided to enable a more thorough understanding of the present disclosure and completely convey the scope of the present disclosure to a person skilled in the art.

Figure 1:
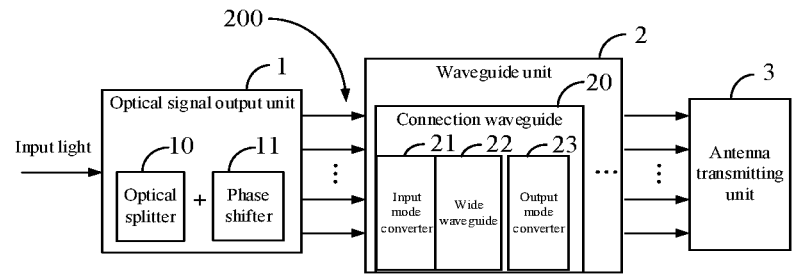
FIG. 1 is a schematic structural diagram of an optical phased array according to some embodiments of the present disclosure.

FIG. 1 is a schematic structural diagram of an optical phased array according to some embodiments of the present disclosure. As shown in FIG. 1, the optical phased array may include an optical signal output unit 1, a waveguide unit 2, and an antenna transmitting unit 3. The optical signal output unit 1 may be configured to output M modulated optical signals, where M is a positive integer. The waveguide unit 2 may include M waveguide pipes 200, each waveguide pipe 200 may include at least one connection waveguide 20, the connection waveguide 20 may include an input mode converter 21, a wide waveguide 22, and an output mode converter 23 that are connected in sequence. The input mode converter 21 may be configured to convert a narrow waveguide into a wide waveguide, and the output mode converter 23 may be configured to convert a wide waveguide into a narrow waveguide. An input end of an input mode converter 21 of one connection waveguide 20 may be connected to the optical signal output unit 1, and an output end of an output mode converter 23 of one connection waveguide 20 may be connected to the antenna transmitting unit 3. The antenna transmitting unit 3 may be connected to the waveguide unit 2 and configured to transmit M optical signals transmitted by the waveguide unit 2.

It should be noted that the optical signal output unit 1 may include an optical splitter 10 and a phase shifter 11. In some embodiments of the present disclosure, the optical splitter 10 may be configured to split input light, and the phase shifter 11 may be configured to shift phases of the light split by the optical splitter 10, to obtain and output a plurality of optical signals of different phases. It is also possible that the optical splitter 10 and the phase shifter 11 are alternately disposed, for example, the input light may be split and phase shifted alternately, to output a plurality of optical signals of different phases finally. After the optical splitter 10 and the phase shifter 11 split and phase-shift the input light respectively, the M optical signals of the different phases may be output. The waveguide unit 2 may receive the M optical signals that are output after being split and phase shifted by the optical splitter 10 and the phase shifter 11 and that carry different phase information, and M output ends of the waveguide unit 2 and M input ends of the antenna transmitting unit 3 may be connected.

Figure 2:
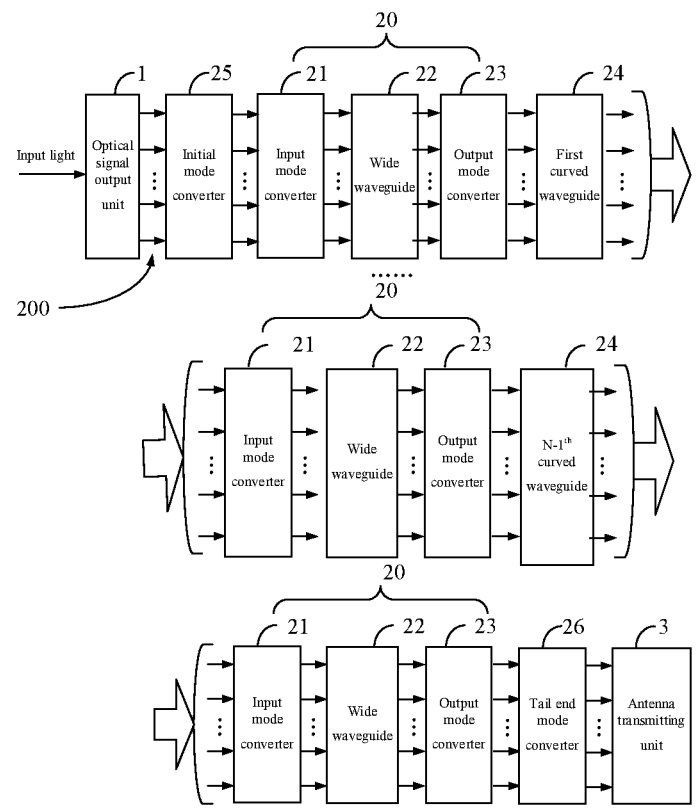
FIG. 2 is a schematic structural diagram of another optical phased array according to some embodiments of the present disclosure.

In some embodiments of the present disclosure, as shown in FIG. 2, each waveguide pipe 200 may further include at least one curved waveguide 24. The curved waveguide 24 may be configured to: connect an output mode converter 23 of one connection waveguide 20 to an input mode converter 21 of an adjacent connection waveguide 20, and bend the waveguide pipe 200. In some instances, an input end of the curved waveguide 24 may be connected to an output end of an output mode converter 23 of a previous connection waveguide 20, and an output end of the curved waveguide 24 may be connected to an input end of an input mode converter 21 of a following connection waveguide 20. In some embodiments, the curved waveguide 24 may be bent 90 degrees. It can be understood that, in some embodiments of the present disclosure, the curved waveguide 24 can alternatively be bent to any other angle between 0 and 180.

It is assumed that each waveguide pipe 200 in the waveguide unit 2 may include N connection waveguides 20, and N is a positive integer. In some embodiments, N may be a positive integer greater than or equal to 3. In some embodiments of the present disclosure, N can alternatively be another positive integer. This is not limited herein. Further referring to FIG. 2, each waveguide pipe 200 in the waveguide unit 2 may include N connection waveguides 20 and N−1 curved waveguides 24, including a first curved waveguide . . . the N−1$^{th}$ curved waveguide. Each connection waveguide 20 may include an input mode converter 21, a wide waveguide 22, and an output mode converter 23. Any adjacent connection waveguides 20 may be connected through one curved waveguide 24. The wide waveguide 22 may be a straight waveguide transmission portion, and a plurality of optical signals are transmitted through a wider waveguide. The curved waveguide 24 may be a curved waveguide transmission portion, and the waveguide pipe 200 may be bent to transmit a plurality of optical signals through a narrow waveguide. A waveguide width of the wide waveguide 22 may be approximately 800 nm to 1 μm, and a waveguide width of the curved waveguide 24 may be approximately 150 nm to 500 nm. In this way, all straight waveguide transmission portions may be transmitted through waveguides of a larger waveguide width, so that a width change of the wide waveguide due to a waveguide width change caused by a process error is less than that of the narrow waveguide in the conventional technology, thereby significantly reducing a phase error. In addition, the narrow waveguide may still be used for the curved waveguide transmission portion to reduce a curve radius of the narrow waveguide, and the narrow waveguide may be equivalent to a mode filter, and can filter out a higher-order mode that may be generated in the wide waveguide.

In some embodiments of the present disclosure, the input mode converter 21 may be configured to convert an input waveguide width of the optical signal or the first waveguide width w1 of the curved waveguide 24 into the second waveguide width w2 of the wide waveguide 22. The output mode converter 23 may be connected between an adjacent wide waveguide 22 and the curved waveguide 24 or between the wide waveguide 22 and the antenna transmitting unit 3. The output mode converter 23 may convert the second waveguide width w2 into the first waveguide width w1 of the curved waveguide 24 or into the input end waveguide width of the antenna transmitting unit 3. The second waveguide width w2 may be greater than the first waveguide width w1, and in some embodiments, the first waveguide width w1 may be a waveguide width w0 of a single-mode waveguide. The input end waveguide width of the optical signal and the input end waveguide width of the antenna transmitting unit 3 may be between the first waveguide width w1 and the second waveguide width w2. In some embodiments, the input end waveguide width of the optical signal and the input end waveguide width of the antenna transmitting unit 3 may be the same as the first waveguide width w1.

Each waveguide pipe 200 may further include an initial mode converter 25 and a tail end mode converter 26. The initial mode converter 25 may be located at an initial end of the waveguide pipe 200, and an input end of the initial mode converter 25 may be connected to the optical signal output unit 1, and an output end of the initial mode converter 25 may be connected to an input mode converter 21 of one connection waveguide 20. The tail end mode converter 26 may be located at a tail end of the waveguide pipe 200, and an input end of the tail end mode converter 26 may be connected to an output mode converter 23 of one connection waveguide 20 at the tail end of the waveguide pipe 200, and an output end may be connected to the antenna transmitting unit 3.

Further referring to FIG. 2, the initial mode converter 25 may be connected to the optical signal output unit 1, N connection waveguides 20 may be connected between the initial mode converter 25 and the tail end mode converter 26, and the curved waveguide 24 may be connected between any adjacent connection waveguides 20. The tail end mode converter 26 may be connected to the antenna transmitting unit 3. In some instances, an input end of the initial mode converter 25 may be connected to the optical signal output unit 1, an output end of the initial mode converter 25 may be connected to an input mode converter 21 of a first connection waveguide 20, and a wide waveguide 22 of the first connection waveguide 20 may be connected between the input mode converter 21 and an output mode converter 23 of the first connection waveguide 20; and an input end of a first curved waveguide 24 may be connected to the output mode converter 23 of the first connection waveguide 20, an output end of the first curved waveguide 24 may be connected to an input mode converter 21 of an adjacent second connection waveguide 20, and so on. An output end of an N−1th curved waveguide 24 may be connected to an input mode converter 21 of an Nth connection waveguide 20, a wide waveguide 22 of the Nth connection waveguide 20 may be connected between the input mode converter 21 and an output mode converter 23 of the Nth connection waveguide 20, the output mode converter 23 of the Nth connection waveguide 20 may be connected to the input end of the tail end mode converter 26, and the output end of the tail end mode converter 26 may be connected to the antenna transmitting unit 3.

The initial mode converter 25 may convert the input waveguide width of the optical signal into the first waveguide width w1, and the input mode converter 21 may convert the first waveguide width w1 into the second waveguide width w2 of the wide waveguide 22. The output mode converter 23 may convert the second waveguide width w2 into the first waveguide width w1 of the curved waveguide 24, and the tail end mode converter 26 may convert the first waveguide width w1 into the input end waveguide width of the antenna transmitting unit 3. A wide straight waveguide transmission portion may be connected to a narrow curved waveguide transmission portion through a mode converter, thereby effectively reducing a loss.

In some embodiments, it should be noted that the first waveguide width w1 may be a waveguide width w0 of a single-mode waveguide. If the input waveguide width of the optical signal is the same as the waveguide width w0 of the single-mode waveguide, the initial mode converter 25 can be omitted, and the input mode converter 21 may directly convert the input waveguide width of the optical signal into the second waveguide width w2 of the wide waveguide 22. Similarly, if the input end waveguide width of the antenna transmitting unit 3 is the same as the waveguide width w0 of the single-mode waveguide, the tail end mode converter 26 can be omitted, and the output mode converter 23 may directly convert the second waveguide width w2 of the wide waveguide 22 into the input end waveguide width of the antenna transmitting unit 3.

In addition, input mode converters of the at least one connection waveguide may have a same structure; output mode converters of the at least one connection waveguide may have a same structure; and the at least one curved waveguide may have a same structure. The initial mode converter 25 and the output mode converter 23 may be cone-shaped waveguides, and have a same structure. In some instances, the mode converters may have a same length and waveguide width. The input mode converter 21 and the tail end mode converter 26 may be cone-shaped waveguides, and have a same structure. In addition, curved waveguides 24 may have a same structure, thereby ensuring that optical path differences of waveguide pipes 200 in an entire waveguide unit 2 are the same. Because a function of a mode converter in each waveguide pipe 200 may be to implement conversion between the curved waveguide 24 and the wide waveguide 22, to improve practicability and reduce system complexity, lengths of cone-shaped waveguides of the mode converters can be kept the same. In some embodiments of the present disclosure, two cone-shaped initial mode converters 25 and an input mode converter 21 of one connection waveguide 20 can be combined into a parabola-shaped mode converter. Similarly, two cone-shaped output mode converters 23 of one connection waveguide 20 and the tail end mode converter 26 can also be combined into a parabola-shaped mode converter. A structure of the parabola-shaped mode converter may be kept the same as a combined structure of the two cone-shaped mode converters. In some embodiments of the present disclosure, a plurality of mode converters may be configured to ensure that a waveguide width of a waveguide in the wide waveguide 22 may be large, thereby reducing a phase error caused by a change in the waveguide width due to a process error.

In some embodiments of the present disclosure, wide waveguides that are opposite to each other in adjacent waveguide pipes 200 in the M waveguide pipes 200 may be approximately parallel to each other, and waveguide gaps may be the same. The waveguide gap may be related to coordinates of the waveguide unit 2 and a number of antennas in the antenna transmitting unit 3. In some embodiment, the waveguide gap may be greater than 5 μm. Length differences between wide waveguides 22 of one of connection waveguides 20 that are opposite to each other in adjacent waveguide pipes 200 in the M waveguide pipes 200 may be the same. The length differences between the wide waveguides 22 of one of the connection waveguides 20 that are opposite to each other in the adjacent waveguide pipes 200 in the M waveguide pipes 200 may be adjusted by using a waveguide gap between wide waveguides 22 of a previous connection waveguide 20. For example, the waveguide length differences between wide waveguides 22 of a second connection waveguide 20 that are opposite to each other in adjacent waveguide pipes 200 may be adjusted by using a waveguide gap between wide waveguides 22 of a first connection waveguide 20 in the pipe.

It can be understood that, further referring to FIG. 2, a waveguide gap between wide waveguides 22 of a first connection waveguide 20 in adjacent waveguide pipes 200 in the M waveguide pipes 200 may be the same as a waveguide gap of adjacent waveguides output by the optical signal output unit 1. A waveguide gap between wide waveguides 22 of an Nth connection waveguide 20 in the adjacent waveguide pipes 200 may be the same as a gap between adjacent antennas in the antenna transmitting unit 3. A length difference between wide waveguides 22 of a previous connection waveguide 20 at another location in adjacent waveguide pipes 200 may be adjusted by using a waveguide gap between wide waveguides 22 of a previous connection waveguide 20. In some instances, if a direction of wide waveguides 22 of the previous connection waveguide 20 in the adjacent waveguide pipes 200 is approximately parallel to a direction of the waveguide output by the optical signal output unit 1, the greater the waveguide gap between the wide waveguides 22 of the previous connection waveguide 20 is, the greater a length difference between wide waveguides 22 of a following connection waveguide 20 may be. If a direction of wide waveguides 22 of the previous connection waveguide 20 in the adjacent waveguide pipes 200 is approximately perpendicular to a direction of the waveguide output by the optical signal output unit 1, the greater the waveguide gap between the wide waveguides 22 of the previous connection waveguide 20 is, the smaller a length difference between wide waveguides 22 of a following connection waveguide 20 may be. For example, a direction of wide waveguides 22 of a first connection waveguide 20 may be the same as the direction of the waveguide output by the optical signal output unit 1, a direction of wide waveguides 22 of a second connection waveguide 20 may be perpendicular to the direction of the waveguide output by the optical signal output unit 1, the greater the waveguide gap between the wide waveguides 22 of the first connection waveguide 20 is, the greater a length difference between wide waveguides 22 of the second connection waveguide 20 may be. The greater the waveguide gap between the wide waveguides 22 of the second connection waveguide 20 is, the smaller a length difference between wide waveguides 22 of a third connection waveguide 20 may be.

In some embodiments of the present disclosure, ends of the wide waveguides 22 of the first connection waveguide 20 that are closest to the optical signal output unit 1 may be located at a same horizontal plane, ends of wide waveguides 22 of a last connection waveguide 20 that are closest to the antenna transmitting unit 3 may be located at a same horizontal plane, the first connection waveguide 20 may be a connection waveguide 20 closest to the optical signal output unit 1, and a last connection waveguide 20 may be the connection waveguide 20 closest to the antenna transmitting unit 3. As shown in FIG. 2, ends of the wide waveguides 22 of the first connection waveguide 20 that are closest to the optical signal output unit 1 may be located at a same horizontal plane, and ends of wide waveguides 22 of an Nth connection waveguide 20 that are closest to the antenna transmitting unit 3 may be located at a same horizontal plane. An optical path difference between adjacent waveguide pipes 200 in the optical phased array can be a ratio of an integer multiple of 360 to a number of antennas, and a total sum of differences between lengths for transmitting the waveguides from the optical signal output unit 1 to the antenna transmitting unit 3 in the adjacent waveguide pipes 200 may be the optical path difference. Because structures of the mode converters and the curved waveguides 24 are completely the same and there may be no difference in waveguide lengths, the optical path difference between the adjacent waveguide pipes 200 in the optical phased array may be equal to a sum of length differences between wide waveguides 22 of the connection waveguides 20 in the adjacent waveguide pipes 200.

In some embodiments of the present disclosure, if locations of the antenna transmitting unit 3 and the optical signal output unit 1 are changed, or are rotated to an angle, a number of connection waveguides 20 will change. In addition, when there are a greater number M of antennas, a waveguide length of the wide waveguide 22 in the connection waveguide 20 may be increased significantly, and a width change of the wide waveguide 22 caused by a waveguide width change due to such process error may be smaller, for example, a phase error change caused by the wide waveguide 22 may be significantly obvious, which can further reduce a phase error caused by the waveguide width change due to the process error. The optical phased array in some embodiments of the present disclosure can be applied to silicon-based CMOS process processing, which may help implement an antenna array of a larger scale.

Figure 3:
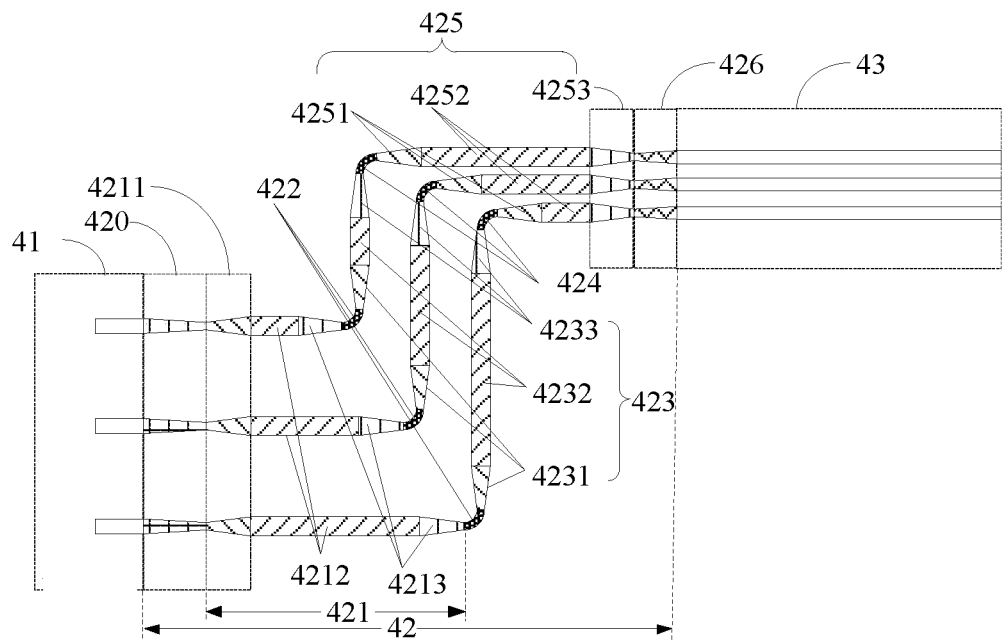
FIG. 3 is a schematic structural diagram of still another optical phased array according to some embodiments of the present disclosure.

An example in which a number M of antennas is equal to 3 and a number N of connection waveguides 20 in each waveguide pipe 200 is 3 may be used for description, and a number of waveguide pipes 200 may be equal to the number of antennas. Referring to FIG. 3, the optical phased array may include an optical signal output unit 41, a waveguide unit 42, and an antenna transmitting unit 43 that are connected in sequence. After the optical signal output unit 41 splits and phase shifts input light respectively through the optical splitter and the phase shifter, 3 optical signals of the different phases may be output. The waveguide unit 42 may include an initial mode converter 420, a first connection waveguide 421, a curved waveguide 422, a second connection waveguide 423, a curved waveguide 424, a third connection waveguide 425, and a tail end mode converter 426 that are connected in sequence. The first connection waveguide 421 may include an input mode converter 4211, a wide waveguide 4212, and an output mode converter 4213 that are connected in sequence; the second connection waveguide 423 may include an input mode converter 4231, a wide waveguide 4232, and an output mode converter 4233 that are connected in sequence; and the third connection waveguide 425 may include an input mode converter 4251, a wide waveguide 4252, and an output mode converter 4253 that are connected in sequence. An input end of the initial mode converter 420 may be connected to the optical signal output unit 41, an output end may be connected to the input mode converter 4211, the wide waveguide 4212 may be connected between the input mode converter 4211 and the output mode converter 4213, the curved waveguide 422 may be connected between the output mode converter 4213 and the input mode converter 4231, the wide waveguide 4232 may be connected between the input mode converter 4231 and the output mode converter 4233, and the curved waveguide 424 may be connected between the output mode converter 4233 and the input mode converter 4251. The wide waveguide 4252 may be connected between the input mode converter 4251 and the output mode converter 4253, an input end of the tail end mode converter 426 may be connected to the output mode converter 4253, and an output end may be connected to the antenna transmitting unit 43.

After a waveguide output by the optical signal output unit 41 passes through a cone-shaped converter in the initial mode converter 420, a waveguide width may be slowly changed to a first waveguide width w1, and in some embodiment, the first waveguide width w1 may be a width w0 of a common single-mode waveguide. Then, conversion may be performed by using the input mode converter 4211, to convert the waveguide width into a second waveguide width w2. The wide waveguide 4212 may transmit the optical signal with the second waveguide width w2, and then the output mode converter 4213 may slowly convert the second waveguide width w2 into the first waveguide width w1. After a series of waveguide bending operations performed by the curved waveguide 422, a direction of the waveguide pipe may be changed. Then, the input mode converter 4231 may convert the first waveguide width w1 into the second waveguide width w2, and then the optical signal may enter the wide waveguide 4232. A waveguide gap between the wide waveguides that are opposite to each other in adjacent waveguide pipes may be reduced. In some instances, the waveguide gap between the wide waveguides 4232 in the adjacent waveguide pipes can be adjusted through a length difference between the wide waveguides 4212. Because a waveguide transmission direction of the wide waveguide 4212 may be the same as a waveguide output direction of the optical signal output unit 41, the greater the length difference between the wide waveguides 4212 in the adjacent waveguide pipes are, the larger the waveguide gap between the wide waveguides 4232 in the adjacent waveguide pipes may be.

After the optical signal enters the wide waveguide 4232, the wide waveguide 4232 may transmit the optical signal with the second waveguide width w2, and then the output mode converter 4233 may slowly convert the second waveguide width w2 into the first waveguide width w1. After a series of waveguide bending operations performed by the curved waveguide 424, a direction of the waveguide pipe may be changed. Then, the input mode converter 4251 may convert the first waveguide width w1 into the second waveguide width w2, and then the optical signal may enter the wide waveguide 4252. A waveguide gap between the wide waveguides 4252 in adjacent waveguide pipes may be reduced. In some instances, the waveguide gap between the wide waveguides 4252 in the adjacent waveguide pipes can be adjusted through a length difference between the wide waveguides 4232 in the adjacent waveguide pipes. Because a waveguide transmission direction of the wide waveguide 4232 may be the same as a waveguide output direction of the optical signal output unit 41, the greater the length difference between the wide waveguides 4252 in the adjacent waveguide pipes is, the smaller the waveguide gap between the wide waveguides 4252 in the adjacent waveguide pipes may be.

After the optical signal enters the wide waveguide 4252, the wide waveguide 4252 may transmit the optical signal with the second waveguide width w2, and then the output mode converter 4253 may slowly convert the second waveguide width w2 into the first waveguide width w1. After the optical signal passes through a series of cone-shaped mode converters of the tail end mode converter 426, the waveguide width may be slowly converted from the first waveguide width w1 into the input end waveguide width of the antenna transmitting unit 43.

In some embodiments of the present disclosure, the wide waveguides 4212, 4232, and 4252 are straight waveguide transmission portions, wide waveguides with a larger width are used to transmit all optical signals, a width change of the wide waveguide due to a waveguide width change caused by a process error may be less than that of the narrow waveguide in the conventional technology, and therefore, the phase error caused by the waveguide width change due to the process error can be reduced. The curved waveguides 422 and 424 are curved waveguide transmission portions, and a narrow single-mode waveguide may still be used to reduce a radius of the curved waveguide, the narrow curved waveguide may be equivalent to a mode filter, and a higher-order mode that may be generated in the wide waveguide can be filtered out. The initial mode converter 420 and the input mode converter 4211 may be configured to implement conversion between a width of the waveguide output by the optical signal output unit 41 and the waveguide width of the wide waveguide 4212, the input mode converters 4231 and 4251 and the output mode converters 4213 and 4233 may be configured to implement conversion between the wide waveguides 4212, 4232, and 4252 and the curved waveguides 422 and 424, and the output mode converter 4253 and the tail end mode converter 426 may be configured to implement conversion between the waveguide width of the wide waveguide 4252 and the input end waveguide width of the antenna transmitting unit 43, thereby effectively reducing a loss.

In some embodiments of the present disclosure, waveguide gaps between the wide waveguides that are opposite to each other in the adjacent waveguide pipes decrease in sequence in a waveguide transmission direction. For example, a waveguide gap between the wide waveguides 4232 in the adjacent waveguide pipes may be less than a waveguide gap between the wide waveguides 4212 in the adjacent waveguide pipes, and a waveguide gap between the wide waveguides 4252 in the adjacent waveguide pipes may be less than a waveguide gap between the wide waveguides 4232 in the adjacent waveguide pipes. The waveguide gap between the wide waveguides 4212 in the adjacent waveguide pipes may be the same as a gap between waveguides output by the optical signal output unit 41, and a waveguide gap between the wide waveguides 4252 in the adjacent waveguide pipes may be the same as a gap between antennas in the antenna transmitting unit 43. The waveguide gap between the wide waveguides 4232 in the adjacent waveguide pipes may be adjusted through a length difference between the wide waveguides 4212 in the adjacent waveguide pipes. Likewise, the waveguide gap between the wide waveguides 4252 in the adjacent waveguide pipes may be adjusted through a length difference between the wide waveguides 4232 in the adjacent waveguide pipes. An optical path difference between the adjacent waveguide pipes in the optical phased array may be equal to a sum of a length difference between the wide waveguides 4212, a length difference between the wide waveguides 4232, and a length difference between the wide waveguides 4252 in the adjacent waveguide pipes.

In some embodiments of the present disclosure, the optical phased array may include an optical signal output unit, a waveguide unit, and an antenna transmitting unit; the optical signal output unit may be configured to output M modulated optical signals, where M may be a positive integer; and the waveguide unit may include M waveguide pipes, each waveguide pipe may include at least one connection waveguide, the connection waveguide may include an input mode converter, a wide waveguide, and an output mode converter that are connected in sequence, the input mode converter may be configured to convert a narrow waveguide into a wide waveguide, the output mode converter may be configured to convert a wide waveguide into a narrow waveguide, an input end of an input mode converter of one connection waveguide may be connected to the optical signal output unit, and an output end of the output mode converter of one connection waveguide may be connected to the antenna transmitting unit; and the antenna transmitting unit may be connected to the waveguide unit and may be configured to transmit M optical signals transmitted by the waveguide unit. Therefore, a plurality of optical signals are transmitted through a wide waveguide, a width change of the wide waveguide due to a waveguide width change caused by a process error may be less than that of the narrow waveguide in the conventional technology, and therefore, the phase error caused by the waveguide width change due to the process error can be reduced.

Embodiments of the present disclosure further discloses a LiDAR, including an optical phased array, a light receiving unit, and a ranging unit. The optical phased array may be configured to emit a laser, the light receiving unit may be configured to receive a laser signal reflected by an object, and the ranging unit may be configured to perform ranging based on the laser signal received by the light receiving unit. A specific structure and a working principle of the optical phased array in some embodiments of the present disclosure may be the same as those of the optical phased array in the foregoing embodiments. Details are not described herein again.

Embodiments of the present disclosure further discloses an intelligent apparatus, including a LiDAR. A specific structure and a working principle of the LiDAR are the same as those of the LiDAR in the foregoing embodiments. Details are not described herein again.

Figure 4:
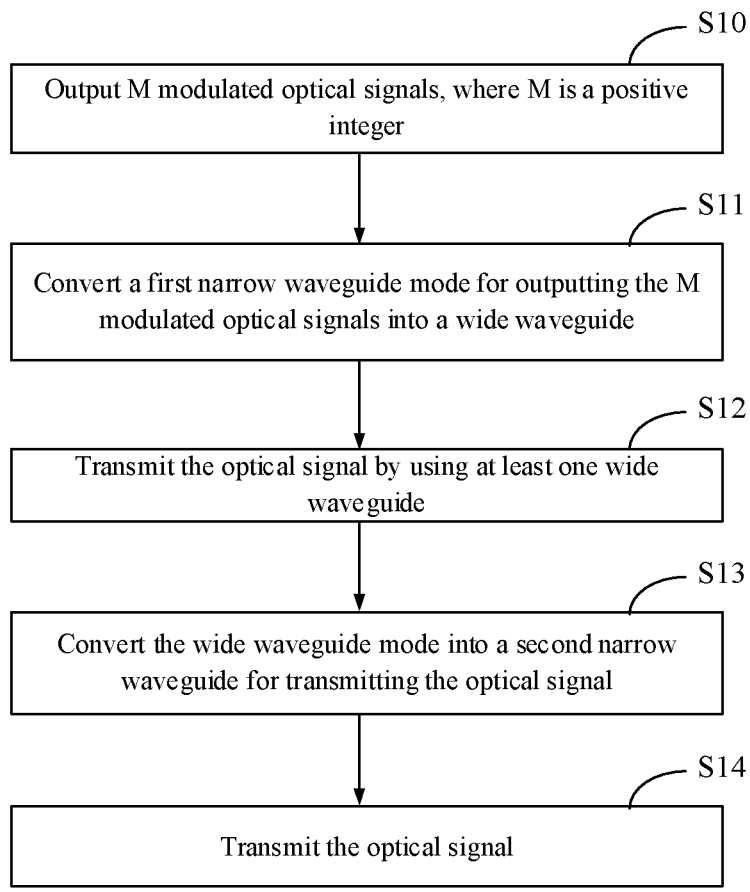
FIG. 4 is a schematic flowchart of a method for reducing a phase error according to some embodiments of the present disclosure.

FIG. 4 is a schematic flowchart of a method for reducing a phase error according to some embodiments of the present disclosure. As shown in FIG. 4, the method for reducing a phase error may be applied to the optical phased array in the foregoing embodiments. The method may include the following steps:

Step S10: Output M modulated optical signals, where M may be a positive integer.

The optical splitter and the phase shifter may split and phase shift the input light respectively, to output M modulated optical signals. In some embodiments, the optical splitter may first split input light, and then the phase shifter may shift phases of the light split by the optical splitter, to obtain and output a plurality of optical signals of different phases. It is also possible that the optical splitter and the phase shifter are alternately disposed, for example, the input light may be split and phase shifted alternately, to output a plurality of optical signals of different phases finally.

Step S11: Convert a first narrow waveguide mode for outputting the M modulated optical signals into a wide waveguide.

The M modulated optical signals may correspond to the M waveguide pipes. In step S11, a waveguide width mode of a first narrow waveguide for outputting the M modulated optical signals may be converted into a second waveguide width w2 of the wide waveguide by using at least one cone-shaped mode converter in each waveguide pipe. The second waveguide width w2 may be greater than the waveguide width of the first narrow waveguide for outputting the M modulated optical signals.

In some embodiments of the present disclosure, a cone-shaped mode converter in each waveguide pipe can be configured to slowly convert, into the waveguide width w0 of the single-mode waveguide, the waveguide width of the first narrow waveguide for outputting the M modulated optical signals. Then, another cone-shaped mode converter may slowly convert the waveguide width w0 of the single-mode waveguide into the second waveguide width w2 of the wide waveguide.

Step S12: Transmit the optical signal by using at least one wide waveguide.

In each waveguide pipe, the wide waveguide may be a straight waveguide transmission portion, and the M modulated optical signals are transmitted through the second waveguide width w2. The second waveguide width w2 may approximately be 800 nm to 1 μm. In this way, all straight waveguide transmission portions may be transmitted through waveguides of a larger waveguide width, so that a width change of the wide waveguide due to a waveguide width change caused by a process error may be less than that of the narrow waveguide in the conventional technology, thereby significantly reducing a phase error.

Step S13: Convert the wide waveguide into a second narrow waveguide for transmitting the optical signal.

In some instances, in each waveguide pipe, at least one cone-shaped mode converter may convert the second waveguide width of the wide waveguide into the waveguide width of the second narrow waveguide for transmitting the optical signal. The second waveguide width w2 may be greater than the waveguide width of the second narrow waveguide for transmitting the optical signal.

In some embodiments of the present disclosure, a cone-shaped mode converter in each waveguide pipe can be configured to slowly convert the second waveguide width w2 of the wide waveguide into the waveguide width w0 of the single-mode waveguide. Then, another cone-shaped mode converter may slowly convert the waveguide width w0 of the single-mode waveguide into the waveguide width of the second narrow waveguide for transmitting the optical signal.

Step S14: Transmit the optical signal.

In some embodiments of the present disclosure, in each waveguide pipe, when a plurality of wide waveguides are configured to transmit the optical signal, a narrow waveguide may be used between two adjacent wide waveguides to change a direction of the waveguide pipe, and mode conversion needs to be performed between the wide waveguide and the narrow waveguide. In this case, the method for reducing a phase error may further include converting the wide waveguide mode into a curved waveguide; bending a waveguide pipe by using the curved waveguide; and converting the curved waveguide mode into the wide waveguide.

In some instances, in each waveguide pipe, a cone-shaped mode converter may slowly convert the second waveguide width w2 of the wide waveguide into the first waveguide width w1 of the curved waveguide. The curved waveguide may bend the waveguide pipe through the first waveguide width w1 and transmit the optical signal, and then another cone-shaped mode converter may slowly convert the first waveguide width w1 of the curved waveguide into the second waveguide width w2 of the wide waveguide. In some embodiment, the first waveguide width w1 of the curved waveguide may be a waveguide width w0 of a single-mode waveguide. In some embodiments, the curved waveguide may bend the waveguide pipe by 90 degrees. The waveguide width of the curved waveguide may approximately be 150 nm to 500 nm. The narrow waveguide may still be used for the curved waveguide transmission portion to reduce a curve radius of the narrow waveguide, and the narrow waveguide may be equivalent to a mode filter, and can filter out a higher-order mode that may be generated in the wide waveguide. A wide straight waveguide transmission portion may be connected to a narrow curved waveguide transmission portion through a mode converter, thereby effectively reducing a loss.

In some embodiments of the present disclosure, the optical phased array may include an optical signal output unit, a waveguide unit, and an antenna transmitting unit; the optical signal output unit may be configured to output M modulated optical signals, where M may be a positive integer; and the waveguide unit may include M waveguide pipes, each waveguide pipe including at least one connection waveguide. The connection waveguide may include an input mode converter, a wide waveguide, and an output mode converter that are connected in sequence, an input end of an input mode converter of one connection waveguide may be connected to the optical signal output unit, and an output end of the output mode converter of one connection waveguide may be connected to the antenna transmitting unit; and the antenna transmitting unit may be connected to the waveguide unit and may be configured to transmit M optical signals transmitted by the waveguide unit. Therefore, a plurality of optical signals may be transmitted through a wide waveguide, a width change of the wide waveguide due to a waveguide width change caused by a process error may be less than that of the narrow waveguide in the conventional technology, and therefore, the phase error caused by the waveguide width change due to the process error can be reduced.

In the specification provided here, a lot of specific details are described. However, it can be understood that embodiments of the present disclosure can be practiced without these specific details. In some instances, common methods, structures, and technologies are not shown in detail, so as not to obscure the understanding of this specification.

Similarly, it should be understood that to streamline this disclosure and help understand one or more of the various inventive aspects, in the foregoing description of the exemplary embodiments of the present disclosure, the various features of the present disclosure are sometimes grouped together into a single implementation, example, diagram, or description. However, the disclosed method should not be interpreted as reflecting the intention that the claimed invention requires more features than those explicitly stated in each claim. To be more specific, as reflected in the following claims, an aspect of the present disclosure may include less features than all the features in a single embodiment disclosed above. Therefore, the claims following the embodiments are thus explicitly incorporated into the embodiments, and each claim serves as a separate embodiment of the present disclosure.

Those skilled in the art can understand that it is possible to adaptively change the modules in an apparatus in the embodiment. The modules can be arranged in one or more devices different from the embodiment. The modules or units or assemblies in the embodiments can be combined into one module or unit or assembly. The modules or units or assemblies can be further divided into a plurality of sub-modules or sub-units or sub-assemblies. Except that at least some of such features and/or processes or units are mutually exclusive, any combination can be configured to apply any combination to all features disclosed in this specification (including the accompanying claims, abstract and drawings) and all the processes or units of any method or the apparatus disclosed in this manner. Unless expressly stated otherwise, each feature disclosed in this specification (including the accompanying claims, abstract and drawings) can be replaced by an alternative feature that serves the same, equivalent or similar objective.

In addition, a person skilled in the art can understand that although some embodiments described herein include some features included in other embodiments instead of other features, a combination of features in different embodiments means that the features fall within the scope of the present disclosure and form different embodiments. For example, in the following claims, any one of the claimed embodiments can be used in any combination manner.

It should be noted that the foregoing embodiments illustrate rather than limit the present disclosure, and the person skilled in the art can design alternative embodiments without departing from the scope of the appended claims. In the claims, any reference signs positioned between parentheses should not be constructed as a limitation to the claims. The word "including" does not exclude the presence of elements or steps not listed in the claims. The word "a" or "an" in front of an element does not exclude the presence of the plurality of such elements. The disclosure can be implemented through hardware including the plurality of different elements and through a suitably programmed computer. In the unit claims enumerating the plurality of devices, the plurality of these devices can be embodied by the same hardware item. The use of the words "first, second, and third", etc. do not indicate any order. These words can be interpreted as names.

What is claimed is:

1. An optical phased array, comprising an optical signal output unit, a waveguide unit, and an antenna transmitting unit, wherein:
the optical signal output unit comprises an optical splitter and a phase shifter, and the optical signal output unit is configured to output M modulated optical signals of different phases, wherein M is a positive integer;
the waveguide unit comprises M waveguide pipes for respectively transmitting the M optical signals, and each waveguide pipe of the M waveguide pipes comprises a plurality of connection waveguides and at least one curved waveguide,
wherein each connection waveguide comprises an input mode converter, a wide waveguide, and an output mode converter that are connected in sequence, wherein the input mode converter is configured to convert a first waveguide width into a second waveguide width of the wide waveguide, the second waveguide width is in a range of 800 nm to 1 μm, the output mode converter is configured to convert the second waveguide width into the first waveguide width, an input end of an input mode converter of one of the plurality of connection waveguides is connected with the optical signal output unit, and an output end of an output mode converter of one of the plurality of connection waveguides is connected with the antenna transmitting unit;

wherein, in each waveguide pipe, one curved waveguide is arranged between adjacent two connection waveguides, and each curved waveguide is configured to connect the output mode converter of one of the adjacent two connection waveguides with the input mode converter of the other of the adjacent two connection waveguides, a width of each curved waveguide is equal to the first waveguide width, and each curved waveguide is configured to bend the waveguide pipe, wherein the width of each curved waveguide is in a range of 150 nm to 500 nm; and the antenna transmitting unit is connected with the waveguide unit and is configured to transmit the M optical signals outputted from the waveguide unit.

2. The optical phased array according to claim 1, wherein each waveguide pipe further comprises an initial mode converter located at the initial end of the waveguide pipe, an input end of the initial mode converter is connected with the optical signal output unit, and an output end of the initial mode converter is connected with an input mode converter of one connection waveguide at the initial end.

3. The optical phased array according to claim 1, wherein each waveguide pipe further comprises a tail end mode converter located at the tail end of the waveguide pipe, an input end of the tail end mode converter is connected with an output mode converter of one connection waveguide at the tail end, and an output end of the tail end mode converter is connected with the antenna transmitting unit.

4. The optical phased array according to claim 1, wherein:
input mode converters of the plurality of connection waveguides have a same structure, output mode converters of the plurality of connection waveguides have a same structure, and the at least one curved waveguide have a same structure.

5. The optical phased array according to claim 4, wherein when M is equal to or larger than 2, two wide waveguides of two connection waveguides that are facing each other in two adjacent waveguide pipes of the M waveguide pipes are parallel to each other.

* * * * *